US012393728B2

(12) United States Patent
Lueck et al.

(10) Patent No.: US 12,393,728 B2
(45) Date of Patent: Aug. 19, 2025

(54) SYSTEM AND METHOD FOR GENERATING DEIDENTIFIED CONTENT

(71) Applicant: Microsoft Technology Licensing, LLC, Redmond, WA (US)

(72) Inventors: Gordon J. Lueck, Seattle, WA (US); Kimia Baxter, Redmond, WA (US); Neal Everette Snider, Belmont, MA (US); Nasr Madi, Montreal (CA); Edgar Rodolfo Quispe Condori, Redmond, WA (US); Maxim Roy, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 18/067,580

(22) Filed: Dec. 16, 2022

(65) Prior Publication Data

US 2024/0202365 A1    Jun. 20, 2024

(51) Int. Cl.
*G06F 21/62*    (2013.01)
*G06N 20/00*    (2019.01)

(52) U.S. Cl.
CPC ......... *G06F 21/6254* (2013.01); *G06N 20/00* (2019.01)

(58) Field of Classification Search
CPC .......................... G06F 21/6254; G06N 20/00
See application file for complete search history.

(56) References Cited

U.S. PATENT DOCUMENTS

| 8,369,523 | B2 | 2/2013 | Tepper | |
|---|---|---|---|---|
| 2019/0325468 | A1* | 10/2019 | Nagarajan | G06Q 30/0207 |
| 2020/0372182 | A1 | 11/2020 | Lowenberg et al. | |
| 2021/0248268 | A1 | 8/2021 | Ardhanari et al. | |
| 2021/0256160 | A1 | 8/2021 | Clayton | |
| 2023/0128345 | A1* | 4/2023 | Spica | G09B 19/00 |

OTHER PUBLICATIONS

"De-identifying sensitive data", Retrieved From: https://cloud.google.com/dlp/docs/deidentify-sensitive-data, Nov. 30, 2022, 26 Pages.
Ali, et al., "Practical Hash-based Anonymity for MAC Addresses", In Proceedings of 17th International Conference on Security and Cryptography, Jan. 2020, pp. 572-579.
Arias, Dan, "Adding Salt to Hashing: A Better Way to Store Passwords", Retrieved From: https://auth0.com/blog/adding-salt-to-hashing-a-better-way-to-store-passwords/, Feb. 25, 2021, 16 Pages.

(Continued)

*Primary Examiner* — Kostas J Katsikis
(74) *Attorney, Agent, or Firm* — Foley IP Law, PLLC

(57) ABSTRACT

A method, computer program product, and computing system for processing raw content to identify personal information; replacing the personal information within the raw content with a first mathematical representation of the personal information generated using a first hashing algorithm, thus defining deidentified content; and defining a selected surrogate for the first mathematical representation, wherein the selected surrogate has a second mathematical representation generated using a second hashing algorithm that is equivalent to the first mathematical representation of the personal information that was generated using the first hashing algorithm.

20 Claims, 7 Drawing Sheets

(56) References Cited

OTHER PUBLICATIONS

Drake, Adam, "Scalable Machine Learning with Fully Anonymized Data", Retrieved From: https://adamdrake.com/scalable-machine-learning-with-fully-anonymized-data.html, Jun. 1, 2018, 5 Pages.
Nuance, "Protecting personal data through de-identification and pseudonymization", Retrieved From: https://www.nuance.com/about-us/trust-center/privacy/de-identification-pseudonymization.html, Retrieved On : Dec. 2, 2022 2 Pages.
International Search Report and Written Opinion received for PCT Application No. PCT/US2023/081486, mailed on Feb. 16, 2024, 16 pages.

\* cited by examiner

SYSTEM AND METHOD FOR GENERATING DEIDENTIFIED CONTENT

TECHNICAL FIELD

This disclosure relates to systems and methods for deidentifying content and, more particularly, to systems and methods for deidentifying content via a hashing operation.

BACKGROUND

As is known in the art, medical professionals may use various computer systems to perform their job. For example, various professionals may use computer systems to review pieces of medical information, train machine learning models, interact with patients, etc.

Further, such ML models need to be trained in order to enhance the accuracy of the same, wherein the training of such models occurs via the use of user data. The long-term storage of such user data (as well as the use of the user data itself) are subject to various data privacy laws and often contractual limitations and internal policies. These constraints limit the usage and long-term storage of such data.

BRIEF DESCRIPTION OF THE DRAWINGS

Like reference symbols in the various drawings indicate like elements.

DETAILED DESCRIPTION OF THE PREFERRED EMBODIMENTS

As will be discussed in greater detail below, implementations of the present disclosure generate deidentified content (e.g., medical content) using a first hashing algorithm (e.g., H1), wherein the deidentified content includes one or more mathematical representations of personal information. This deidentified content is then processed to generate surrogated content that includes one or more surrogates that are mappable via a second hashing algorithm (e.g., H2) to the one or more mathematical representations within the deidentified content.

By using two hashing algorithms (H1 & H2), the second hashing algorithm (the one that maps the surrogates to the mathematical representations) can be freely shared (e.g., with researcher/trainers) without fear of that hashing algorithm being used to map the mathematical representations back to the personal information, as that would require the first hashing algorithm (which is maintained in confidence).

The details of one or more implementations are set forth in the accompanying drawings and the description below. Other features and advantages will become apparent from the description, the drawings, and the claims.

Figure 1:
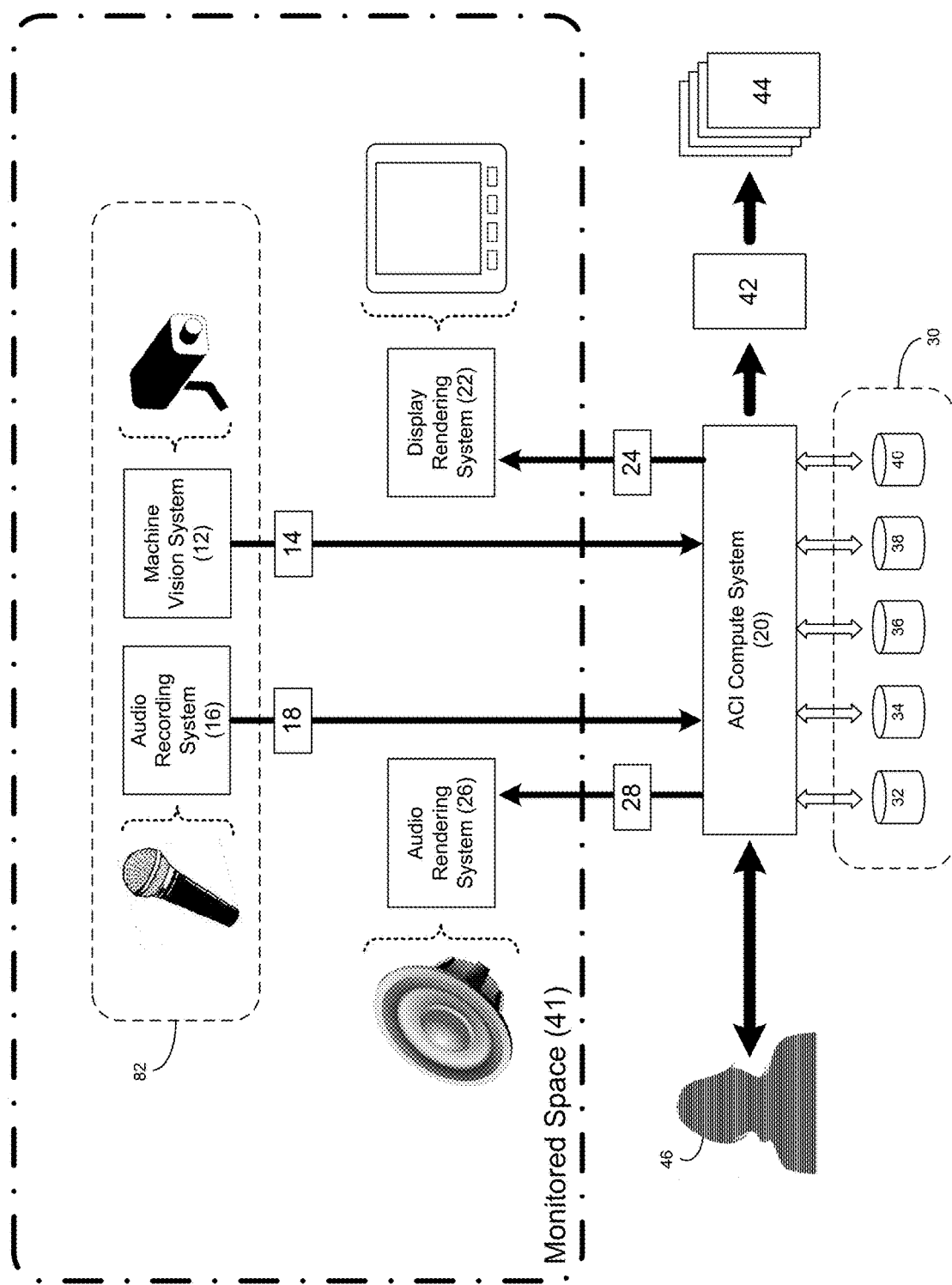
FIG. 1 is a diagrammatic view of an ambient cooperative intelligence (ACI) system.

Ambient Cooperative Intelligence System:

Referring to FIG. 1, while ambient cooperative intelligence (ACI) system 10 will be described below as being used to automate the collection and processing of clinical encounter information to generate/store/distribute medical records, this is for illustrative purposes only and is not intended to be a limitation of this disclosure, as other configurations are possible and are considered to be within the scope of this disclosure.

Examples of ACI system 10 include: machine vision system 12 to obtain machine vision encounter information 14 concerning a patient encounter; audio recording system 16 to obtain audio encounter information 18 concerning the patient encounter; and a compute system (e.g., ACI compute system 20) to receive machine vision encounter information 14 and audio encounter information 18 from machine vision system 12 and audio recording system 16 (respectively). In some implementations, ACI system 10 includes: display rendering system 22 to render visual information 24; and audio rendering system 26 to render audio information 28, wherein ACI compute system 20 provides visual information 24 and audio information 28 to display rendering system 22 and audio rendering system 26 (respectively).

In some implementations:
  machine vision system 12 includes: an RGB imaging system, an infrared imaging system, an ultraviolet imaging system, a laser imaging system, a SONAR imaging system, a RADAR imaging system, and/or a thermal imaging system.
  audio recording system 16 includes: a handheld microphone, a lapel microphone, an embedded microphone (e.g., embedded within eyeglasses, smart phones, tablet computers and/or watches), and/or an audio recording device.
  display rendering system 22 includes: a tablet computer, a computer monitor, and/or a smart television.
  audio rendering system 26 includes: a speaker system, a headphone system, and/or an earbud system.

In some implementations, ACI compute system 20 accesses one or more datasources 30 (e.g., plurality of individual datasources 32, 34, 36, 38, 40), examples of which include one or more of an electronic health record (EHR) datasource, a user profile datasource, a voice print datasource, a voice characteristics datasource, a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, a physical events datasource, and a home healthcare datasource.

ACI system 10 monitors a monitored space (e.g., monitored space 41) in a clinical environment, wherein examples of this clinical environment include: a doctor's office, a medical facility, a medical practice, a medical lab, an urgent care facility, a medical clinic, an emergency room, an operating room, a hospital, a long-term care facility, a rehabilitation facility, a nursing home, and a hospice facility. Accordingly, an example of the above-referenced patient encounter includes a patient visiting one or more of the above-described clinical environments (e.g., a doctor's office, a medical facility, a medical practice, a medical lab, an urgent care facility, a medical clinic, an emergency room, an operating room, a hospital, a long-term care facility, a rehabilitation facility, a nursing home, and a hospice facility).

In some implementations, machine vision system 12 includes a plurality of discrete machine vision systems when the above-described clinical environment is larger or a higher level of resolution is desired. As discussed above, examples of machine vision system 12 include: an RGB imaging system, an infrared imaging system, an ultraviolet imaging system, a laser imaging system, a SONAR imaging system, a RADAR imaging system, and a thermal imaging system. Accordingly and in some implementations, machine vision system 12 includes one or more of each of an RGB imaging system, an infrared imaging system, an ultraviolet imaging system, a laser imaging system, a SONAR imaging system, a RADAR imaging system, and a thermal imaging system.

In some implementations, audio recording system 16 includes a plurality of discrete audio recording systems when the above-described clinical environment is larger or a higher level of resolution is desired. As discussed above, examples of audio recording system 16 includes one or more of: a handheld microphone, a lapel microphone, an embedded microphone (such as those embedded within eyeglasses, smart phones, tablet computers and/or watches) and an audio recording device. Accordingly and in some implementations, audio recording system 16 includes one or more of each of a handheld microphone, a lapel microphone, an embedded microphone (such as those embedded within eyeglasses, smart phones, tablet computers and/or watches) and an audio recording device.

In some implementations, display rendering system 22 includes a plurality of discrete display rendering systems when the above-described clinical environment is larger or a higher level of resolution is desired. As discussed above, examples of display rendering system 22 include: a tablet computer, a computer monitor, and a smart television. Accordingly and in some implementations, display rendering system 22 includes one or more of each of a tablet computer, a computer monitor, and a smart television.

In some implementations, audio rendering system 26 includes a plurality of discrete audio rendering systems when the above-described clinical environment is larger or a higher level of resolution is desired. As discussed above, examples of audio rendering system 26 include: a speaker system, a headphone system, or an earbud system. Accordingly and in some implementations, audio rendering system 26 includes one or more of each of a speaker system, a headphone system, or an earbud system.

In some implementations, ACI compute system 20 includes a plurality of discrete compute systems. As discussed above, examples of ACI compute system 20 includes various components, examples of which include: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform. Accordingly and in some implementations, ACI compute system 20 includes one or more of each of a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

Figure 2:
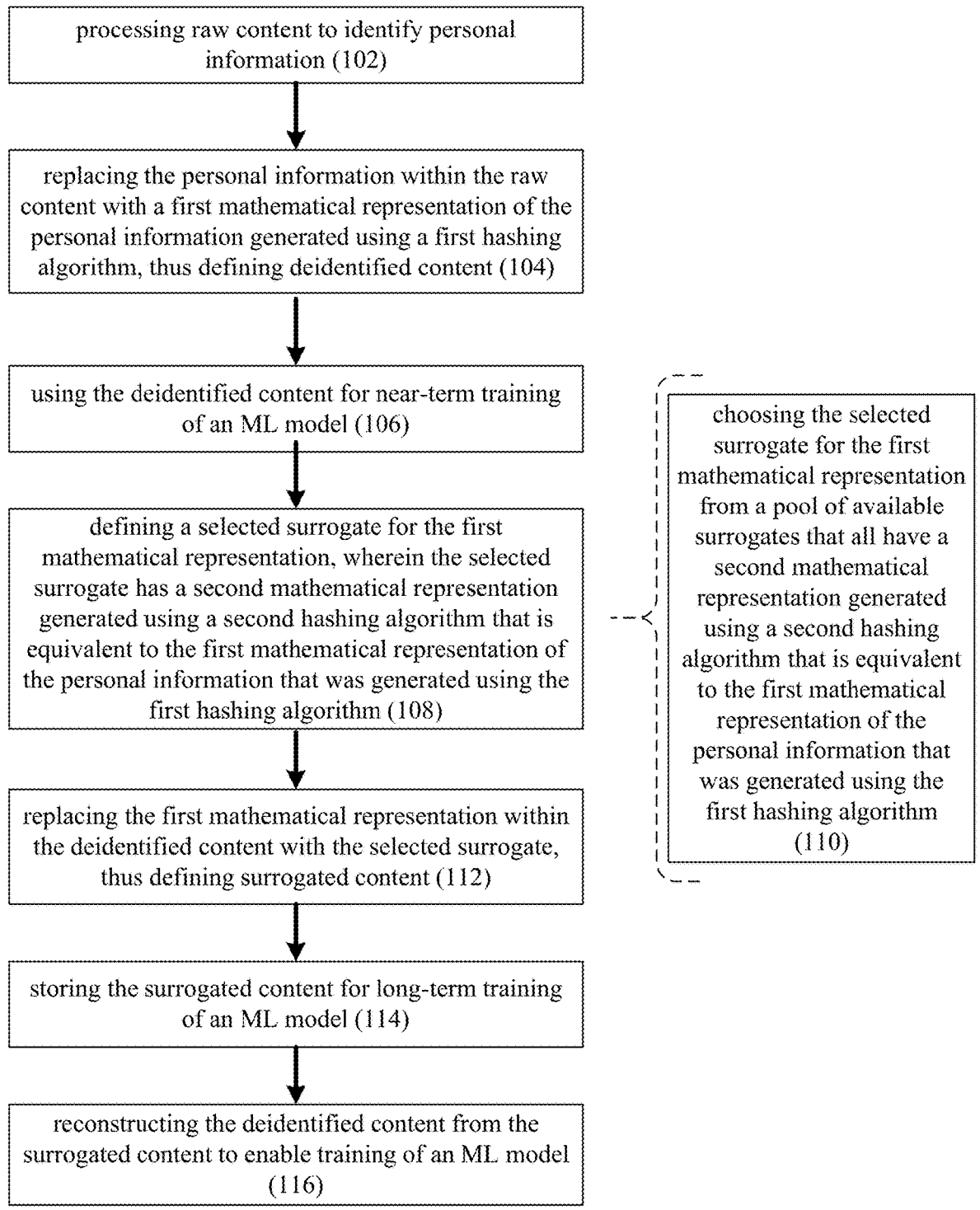
FIG. 2 is a flow chart of one implementation of a content deidentification process.
Figure 3:
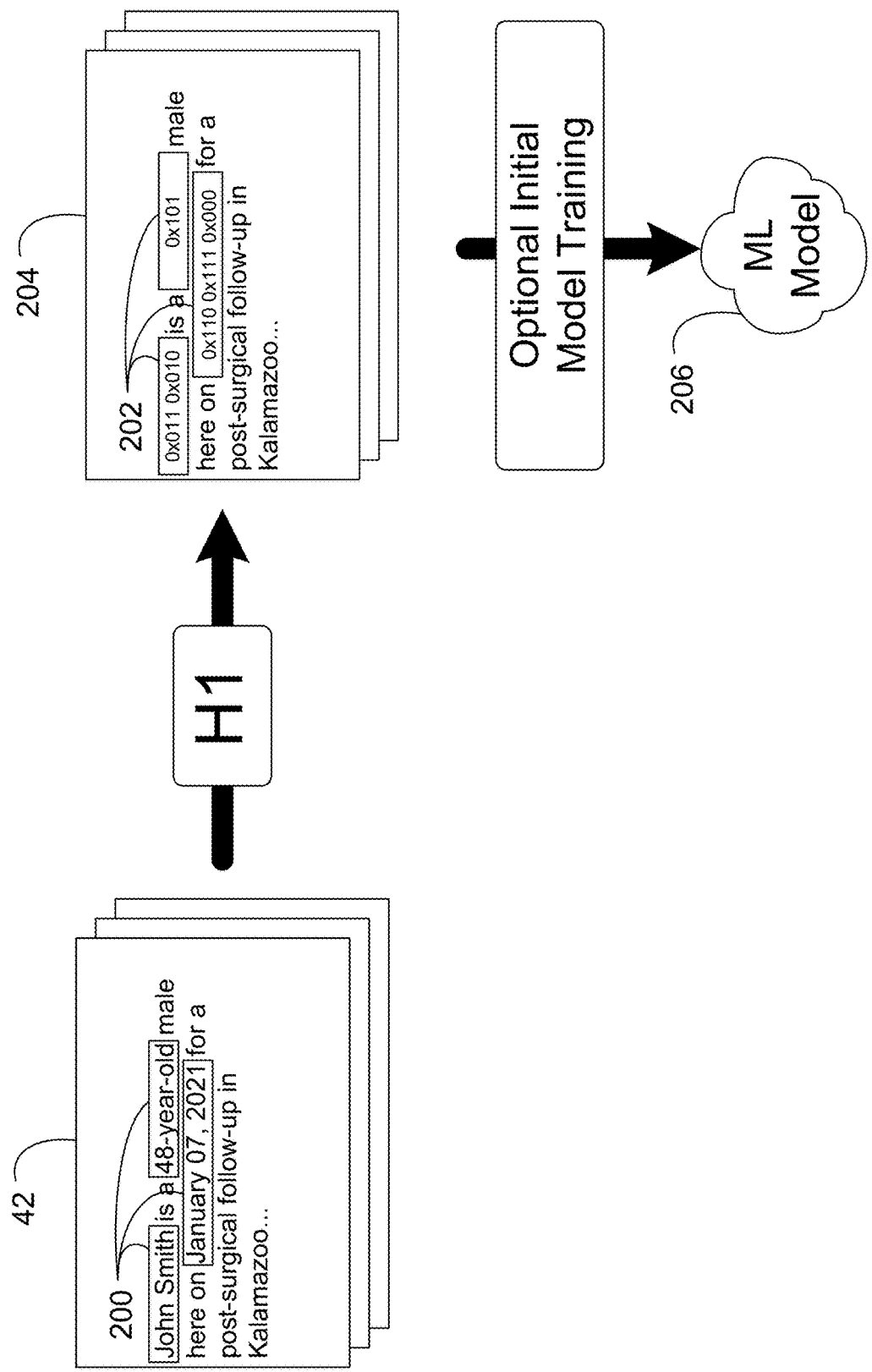
FIG. 3 is a diagrammatic view of hash mappings by the content deidentification process of FIG. 1.

The Content Deidentification Process:

Referring also to FIGS. 2-3, ACI system 10 executes content deidentification process 100. Content deidentification process 100 processes 102 raw content (e.g., encounter transcript 42) to identify personal information (e.g., personal information 200). While in this particular example, the raw content is described below as being an encounter transcript, this is for illustrative purposes only and is not intended to be a limitation of this disclosure, as other configurations are possible and are considered to be within the scope of this disclosure. Specifically, this raw content may be any raw content within which personal information (e.g., personal information 200) is included and, therefore, is not limited to an encounter transcript and/or medical content. Accordingly, other examples of such raw content may include but are not limited to legal raw content, financial raw content, and educational raw content.

An example of the personal information (e.g., personal information 200) includes personally identifiable information, such as protected health information. Protected health information (PHI) under the U.S. law is any information about health status, provision of health care, or payment for health care that is created or collected by a Covered Entity (or a Business Associate of a Covered Entity), and can be linked to a specific individual. This is interpreted rather broadly and includes any part of a patient's medical record or payment history. Instead of being anonymized, PHI is often sought out in datasets for de-identification before researchers share the dataset publicly. Researchers remove individually identifiable PHI from a dataset to preserve privacy for research participants. There are many forms of PHI, with the most common being physical storage in the form of paper-based personal health records (PHR). Other types of PHI include electronic health records, wearable technology, and mobile applications. In recent years, there has been a growing number of concerns regarding the safety and privacy of PHI.

Upon processing 102 encounter transcript 42 to identify personal information 200, content deidentification process 10 replaces 104 the personal information (e.g., personal information 200) within the raw content (e.g., encounter transcript 42) with a first mathematical representation (e.g., first mathematical representation 202) of the personal information (e.g., personal information 200) generated using a first hashing algorithm (H1), thus defining deidentified content 204.

A hash function (e.g., first hashing algorithm H1) is any function that can be used to map data of arbitrary size to fixed-size values. The values returned by a hash function are called hash values, hash codes, digests, or simply hashes. The values are usually used to index a fixed-size table called a hash table. Use of a hash function to index a hash table is called hashing or scatter storage addressing. Hash functions and their associated hash tables are used in data storage and retrieval applications to access data in a small and nearly constant time per retrieval. They require an amount of storage space only fractionally greater than the total space required for the data or records themselves. Hashing is a computationally and storage space-efficient form of data access that avoids the non-constant access time of ordered and unordered lists and structured trees, and the often-exponential storage requirements of direct access of state spaces of large or variable-length keys.

Figure 4:
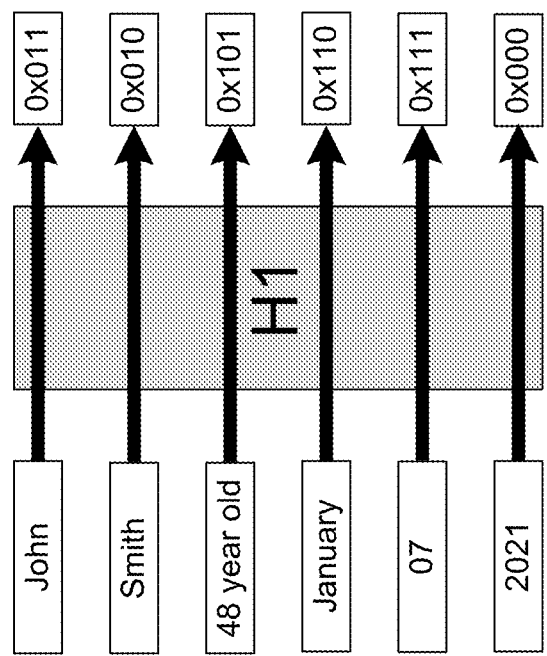
FIG. 4 is a diagrammatic view of hash mappings by the content deidentification process of FIG. 1.

Referring also to FIG. 4, there is shown one particular example of the manner in which content deidentification process 100 replaces 104 personal information 200 within encounter transcript 42 with first mathematical representation 202 of personal information 200 that was generated using a first hashing algorithm (H1).

Specifically and in this example:
- When "John" is processed 102 using first hashing algorithm (H1), "John" maps to (in this illustrative example) "0x011", thus allowing the replacement 104 of "John" within the raw content (e.g., encounter transcript 42) with "0x001" within deidentified content 204;
- When "Smith" is processed 102 using first hashing algorithm (H1), "Smith" maps to (in this illustrative example) "0x010", thus allowing the replacement 104 of "Smith" within the raw content (e.g., encounter transcript 42) with "x010" within deidentified content 204;
- When "48-year-old" is processed 102 using first hashing algorithm (H1), "48-year-old" maps to (in this illustrative example) "0x101", thus allowing the replacement 104 of "48-year-old" within the raw content (e.g., encounter transcript 42) with "0x010" within deidentified content 204;
- When "January" is processed 102 using first hashing algorithm (H1), "January" maps to (in this illustrative example) "0x110", thus allowing the replacement 104 of "January" within the raw content (e.g., encounter transcript 42) with "0x110" within deidentified content 204;
- When "07" is processed 102 using first hashing algorithm (H1), "07" maps to (in this illustrative example) "0x111", thus allowing the replacement 104 of "07" within the raw content (e.g., encounter transcript 42) with "0x111" within deidentified content 204; and
- When "2021" is processed 102 using first hashing algorithm (H1), "2021" maps to (in this illustrative example) "0x000", thus allowing the replacement 104 of "2021" within the raw content (e.g., encounter transcript 42) with "0x000" within deidentified content 204.

When generating the above-described first mathematical representation 202 of personal information 200, a salting technique may be used. In cryptography, a salt is random data that is used as an additional input to a one-way function that hashes data. Salts are used to safeguard data in storage. Historically, only the output from an invocation of a cryptographic hash function on the data was stored on a system, but, over time, additional safeguards were developed to protect against duplicate or common data being identifiable (as their hashes are identical). Salting is one such protection. A new salt is randomly generated for each piece of data. Typically, the salt and the data (or its version after key stretching) are concatenated and fed to a cryptographic hash function, and the output hash value (but not the original data) is stored with the salt in a database. Salts defend against attacks by rendering the use of precomputed data such as rainbow tables useless against discovering the mapping from hash value to personally identifiable information.

Content deidentification process 100 may use deidentified content 204 for optional initial training of an ML model (e.g., ML model 206), wherein ACI system 10 may use 106 ML model 206 to generate and/or process the raw content (e.g., encounter transcript 42). Specifically, ML models (e.g., ML model 206) may be easily and effectively trained using mathematical representations (e.g., mathematical representations 202) of the personal information (e.g., personal information 200).

Machine learning (ML) is a field of inquiry devoted to understanding and building methods that 'learn', that is, methods that leverage data to improve performance on some set of tasks. It is seen as a part of artificial intelligence. Machine learning algorithms build a model based on sample data, known as training data, in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

A subset of machine learning is closely related to computational statistics, which focuses on making predictions using computers, but not all machine learning is statistical learning. The study of mathematical optimization delivers methods, theory and application domains to the field of machine learning. Data mining is a related field of study, focusing on exploratory data analysis through unsupervised learning. Some implementations of machine learning use data and neural networks in a way that mimics the working of a biological brain. In its application across business problems, machine learning is also referred to as predictive analytics.

A machine learning system or model generally includes an algorithm or combination of algorithms that has been trained to recognize certain types of patterns. For example, machine learning approaches are generally divided into three categories, depending on the nature of the signal available: supervised learning, unsupervised learning, and reinforcement learning. Supervised learning includes presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning generally includes a computing device interacting in a dynamic environment in which it must perform a certain goal (such as driving a vehicle or playing a game against an opponent). As the machine learning system navigates its problem space, the machine learning system is provided feedback that's analogous to rewards, which it tries to maximize.

Figure 5:
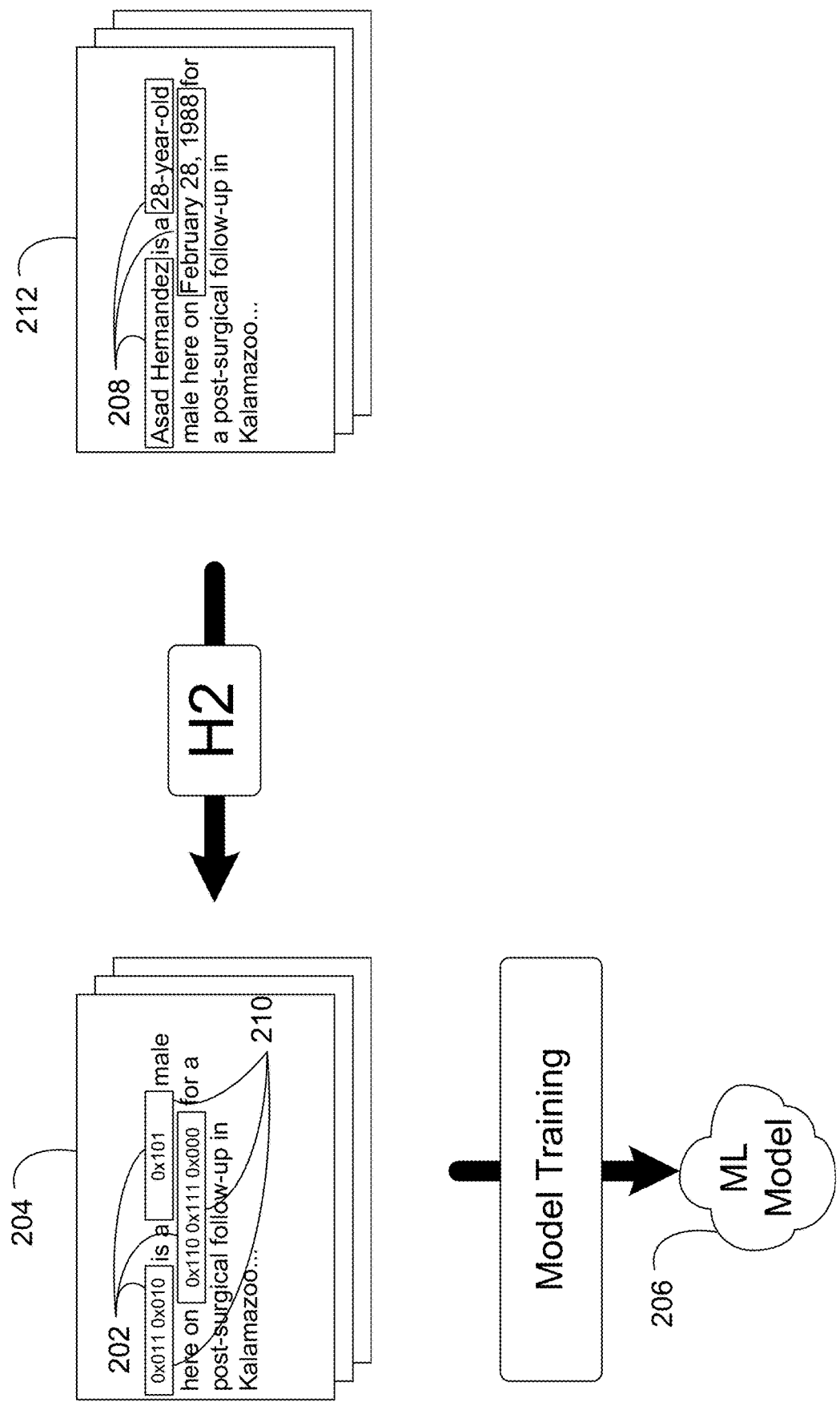
FIG. 5 is a diagrammatic view of hash mappings by the content deidentification process of FIG. 1.
Figure 6:
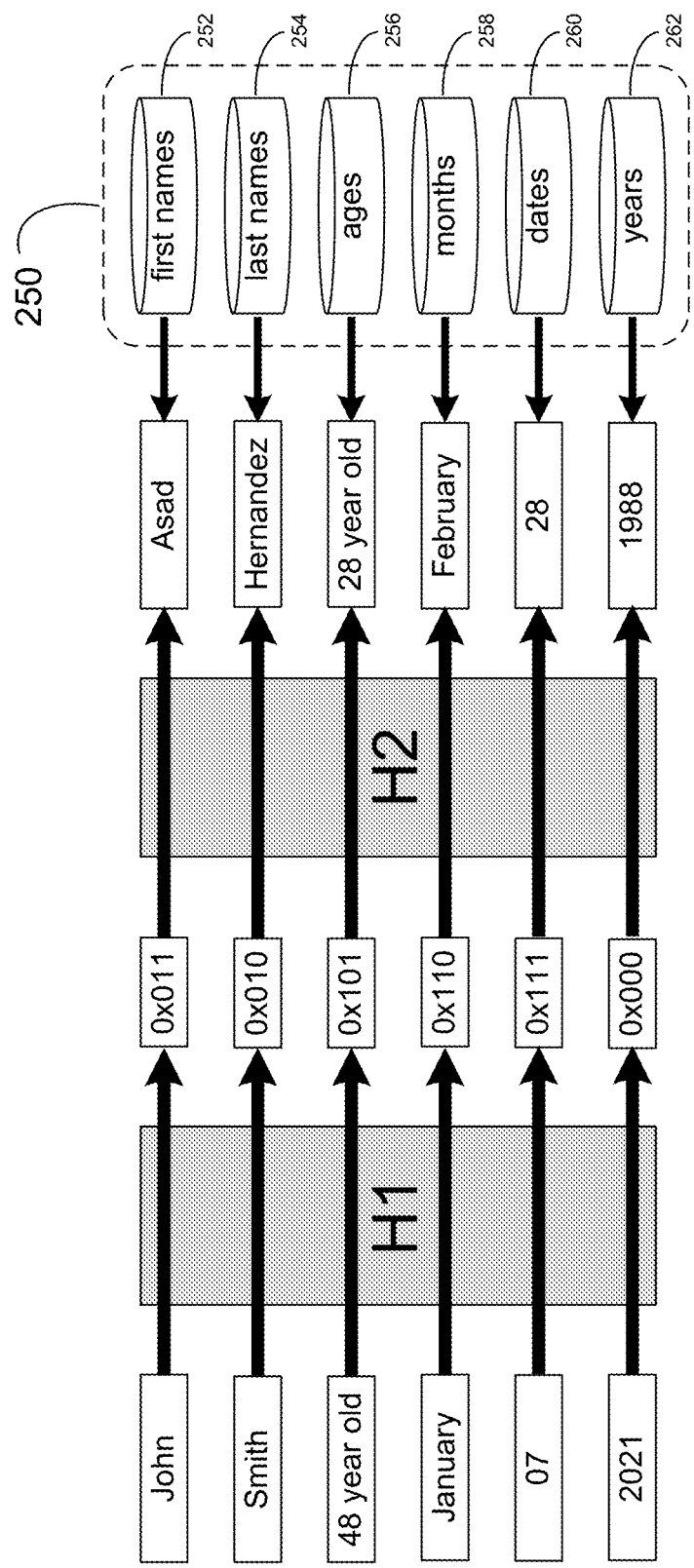
FIG. 6 is a diagrammatic view of hash mappings by the content deidentification process of FIG. 1.

Referring also to FIGS. 5-6, content deidentification process 100 defines 108 a selected surrogate (e.g., selected surrogate 208) for the first mathematical representation (e.g., first mathematical representation 202), wherein the selected surrogate (e.g., selected surrogate 208) has a second mathematical representation (e.g., second mathematical representation 210) generated using a second hashing algorithm (H2) that is equivalent to the first mathematical representation (e.g., first mathematical representation 202) of the personal information (e.g., personal information 200) that was generated using first hashing algorithm H1.

When defining 108 a selected surrogate (e.g., selected surrogate 208) for the first mathematical representation (e.g., first mathematical representation 202), content deidentification process 100 may choose 110 the selected surrogate (e.g., selected surrogate 208) for the first mathematical representation (e.g., first mathematical representation 202) from a pool of available surrogates (e.g., available surrogate pool 250) that all have a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

As will be explained below, the pool of available surrogates (e.g., available surrogate pool 250) may be defined by processing a list of items using second hashing algorithm H2 to define the second mathematical representation (e.g., second mathematical representation 210) for each of the list of items. Examples of the list of items includes one or more of a list of names; a list of locations; a list of ailments; a list of symptoms; a list of allergies; a list of medications; a list of demographic identifiers; a list of ages; a list of genders; a list of races; and a list of ethnicities.

For example, the pool of available surrogates (e.g., available surrogate pool 250) may be compartmentalized into a plurality of discrete pools that are associated with the type of personal information that was replaced with the first mathematical representation (e.g., first mathematical representation 202).

For example:
"John" was processed 102 using first hashing algorithm (H1) and replaced with (in this illustrative example) "0x011". Being "John" is a first name, when defining 108 a selected surrogate (e.g., selected surrogate 208) for first mathematical representation 202 (namely 0x011), content deidentification process 100 randomly chooses 110 the selected surrogate (e.g., selected surrogate 208) for "0x011" from "first names" pool 252 within available surrogate pool 250.

"First names" pool 252 may include a list of first names, all having a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

In this particular example, "Asad" is randomly defined 108 as a surrogate for "0x011", as "Asad" maps to (in this illustrative example) "0x011" using second hashing algorithm H2 (as did "John" using first hashing algorithm H1).

As stated above, every first name in "First names" pool 252 maps to "0x011" using second hashing algorithm H2. Accordingly, "Asad" may be randomly selected (e.g., via a random number generator) from this group of first names within "First names" pool 252, as any of those first names maps to "0x011";

"Smith" was processed 102 using first hashing algorithm (H1) and replaced with (in this illustrative example) "0x010". Being "Smith" is a last name, when defining 108 a selected surrogate (e.g., selected surrogate 208) for first mathematical representation 202 (namely 0x010), content deidentification process 100 randomly chooses 110 the selected surrogate (e.g., selected surrogate 208) for "0x010" from "last names" pool 254 within available surrogate pool 250.

"Last names" pool 254 may include a list of last names, all having a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

In this particular example, "Hernandez" is randomly defined 108 as a surrogate for "x00", as "Hernandez" maps to (in this illustrative example) "x00" using second hashing algorithm H2 (as did "Smith" using first hashing algorithm H1).

As stated above, every last name in "Last names" pool 254 maps to "0x010" using second hashing algorithm H2. Accordingly, "Hernandez" may be randomly selected (e.g., via a random number generator) from this group of last names within "Last names" pool 254, as any of those last names maps to "0x00";

"48-year-old" was processed 102 using first hashing algorithm (H1) and replaced with to (in this illustrative example) "0x101". Being "48-year-old" is an age, when defining 108 a selected surrogate (e.g., selected surrogate 208) for first mathematical representation 202 (namely 0x101), content deidentification process 100 randomly chooses 110 the selected surrogate (e.g., selected surrogate 208) for "0x101" from "ages" pool 256 within available surrogate pool 250.

"Ages" pool 256 may include a list of ages, all having a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

In this particular example, "28 year old" is randomly defined 108 as a surrogate for "0x010", as "28 year old" maps to (in this illustrative example) "0x101" using second hashing algorithm H2 (as did "48 year old" using first hashing algorithm H1).

As stated above, every age in "Ages" pool 256 maps to "0x101" using second hashing algorithm H2. Accordingly, "28 year old" may be randomly selected (e.g., via a random number generator) from this group of ages within "Ages" pool 256, as any of those ages maps to "0x101";

"January" was processed 102 using first hashing algorithm (H1) and replaced with (in this illustrative example) "0x110". Being "January" is a month, when defining 108 a selected surrogate (e.g., selected surrogate 208) for first mathematical representation 202 (namely 0x110), content deidentification process 100 randomly chooses 110 the selected surrogate (e.g., selected surrogate 208) for "0x110" from "Months" pool 258 within available surrogate pool 250.

"Months" pool 258 may include a list of months, all having a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

In this particular example, "February" is randomly defined 108 as a surrogate for "0x110", as "February" maps to (in this illustrative example) "0x110" using second hashing algorithm H2 (as did "January" using first hashing algorithm H1).

As stated above, every month in "Months" pool 258 maps to "0x110" using second hashing algorithm H2. Accordingly, "February" may be randomly selected (e.g., via a random number generator) from this group of months within "Months" pool 258, as any of those months maps to "0x110";

"07" was processed 102 using first hashing algorithm (H1) and replaced with (in this illustrative example) "0x111". Being "07" is a date, when defining 108 a selected surrogate (e.g., selected surrogate 208) for first mathematical representation 202 (namely 0x111), content deidentification process 100 randomly chooses 110 the selected surrogate (e.g., selected surrogate 208) for "0x111" from "dates" pool 260 within available surrogate pool 250.

"Dates" pool 260 may include a list of dates, all having a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

In this particular example, "28" is randomly defined 108 as a surrogate for "0x111", as "28" maps to (in this illustrative example) "0x111" using second hashing algorithm H2 (as did "07" using first hashing algorithm H1).

As stated above, every date in "Dates" pool 260 maps to "0x111" using second hashing algorithm H2. Accordingly, "28" may be randomly selected (e.g., via a random number generator) from this group of dates within "Dates" pool 260, as any of those dates maps to "0x111"; and "2021" was is processed 102 using first hashing algorithm (H1) and replaced with (in this illustrative example) "0x000". Being "2021" is a year, when defining 108 a selected surrogate (e.g., selected surrogate 208) for first mathematical representation 202 (namely 0x000), content deidentification process 100 randomly chooses 110 the selected surrogate (e.g., selected surrogate 208) for "0x000" from "years" pool 262 within available surrogate pool 250.

"Years" pool 262 may include a list of years, all having a second mathematical representation (e.g., second mathematical representation 210) generated using second hashing algorithm H2 that is equivalent to the first mathematical representation (e.g., first mathematical representation 202) of the personal information (e.g., personal information 200) that was generated using first hashing algorithm H1.

In this particular example, "1988" is randomly defined 108 as a surrogate for "0x000", as "1988" maps to (in this illustrative example) "0x000" using second hashing algorithm H2 (as did "2021" using first hashing algorithm H1)

As stated above, every year in "Years" pool 262 maps to "0x000" using second hashing algorithm H2. Accordingly, "1988" may be randomly selected (e.g., via a random number generator) from this group of years within "Years" pool 262, as any of those years maps to "0x000".

The width of second hashing algorithm H2 may be used to control the "randomness" of the above-described process. For example, by using a second hashing algorithm H2 that is narrow in width, the resulting digest will be shorter, resulting in a high collision rate, a higher amount of overlap and the result being randomly selected from a larger quantity of choices. However, by using a second hashing algorithm H2 that is wider in width, the resulting digest will be longer, resulting in a lower collision rate, a lower amount of overlap and the result being randomly selected from a smaller quantity of choices.

Once content deidentification process 100 defines 108 a selected surrogate (e.g., selected surrogate 208) for the first mathematical representation (e.g., first mathematical representation 202), content deidentification process 100 replaces 112 the first mathematical representation (e.g., first mathematical representation 202) within the deidentified content (e.g., deidentified content 204) with the selected surrogate (e.g., selected surrogate 208), thus defining surrogated content 212.

Content deidentification process 100 may store 114 surrogated content 212 for training of the ML model (e.g., ML model 206). For example and through the use of second hashing algorithm H2, content deidentification process 100 may reconstruct 116 the deidentified content (e.g., deidentified content 204) from the surrogated content (e.g., surrogated content 212) to enable training of the ML model (e.g., ML model 206). As discussed above, ML models (e.g., ML model 206) may be easily and effectively trained using mathematical representations (e.g., mathematical representations 202) of the personal information (e.g., personal information 200). And being second hashing algorithm H2 cannot map the personal information (e.g., personal information 200) to mathematical representations (e.g., mathematical representations 202), second hashing algorithm H2 may be freely shared with researchers/trainers of ML model 206.

While the above discussion concerning H1 & H2 seems to imply that H1 & H2 are different algorithms, this is not necessarily true and is simply one of the configurations in which content deidentification process 100 may be implemented. For example and in other implementations of content deidentification process 100, H1 & H2 may be the same algorithm. Naturally and in the event that H1 & H2 are the same algorithm, the above-described free sharing of the hashing algorithm with researchers/trainers of ML model 206 would likely not occur to prevent the mapping of personal information (e.g., personal information 200) to the mathematical representations (e.g., mathematical representations 202).

Figure 7:
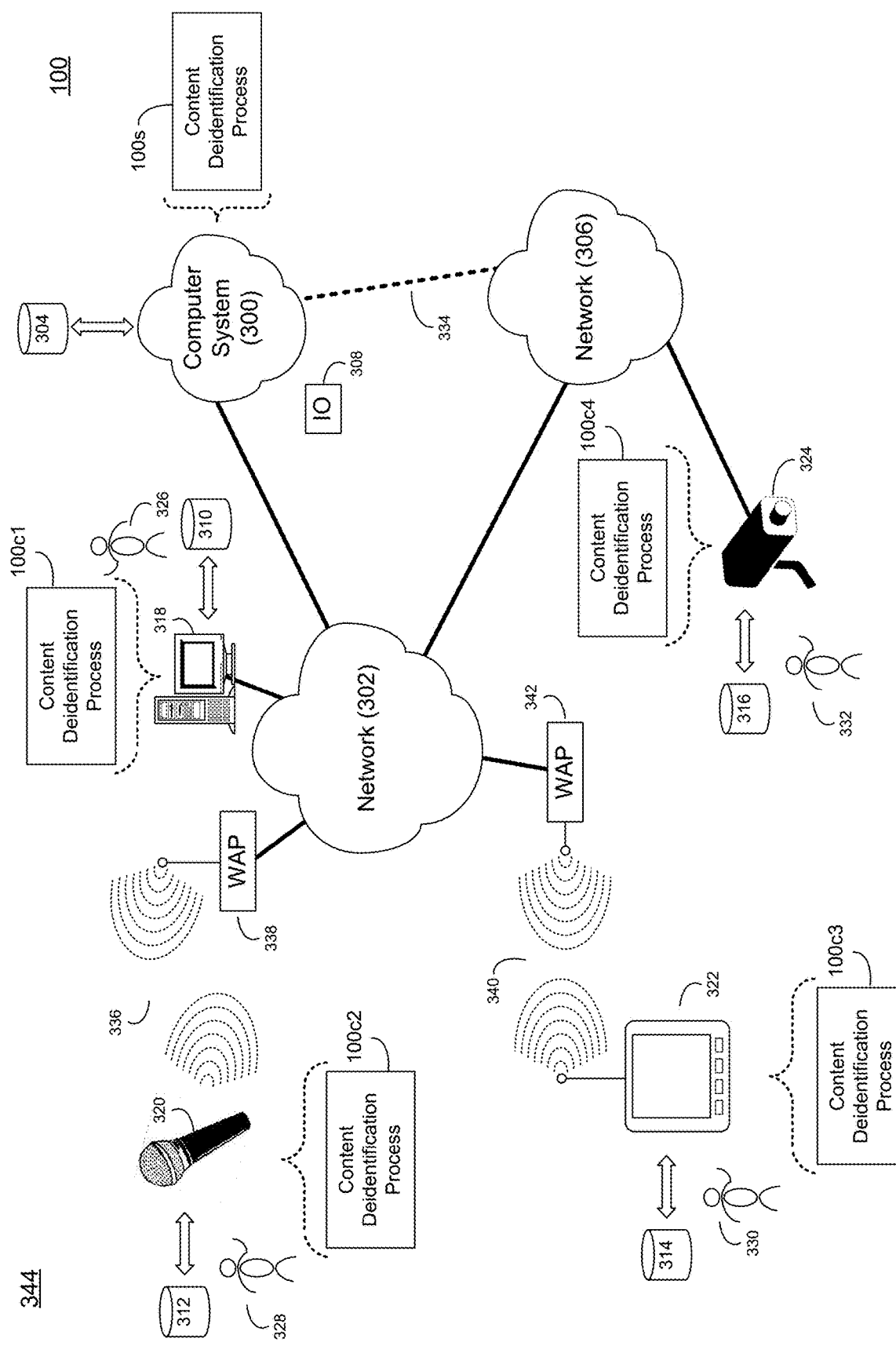
FIG. 7 is a diagrammatic view of a computer system and the content deidentification process coupled to a distributed computing network.

System Overview:

Referring to FIG. 7, there is shown content deidentification process 100. In some implementations, content deidentification process 100 is implemented as a server-side process, a client-side process, or a hybrid server-side/client-side process. For example, content deidentification process 100 may be implemented as a purely server-side process via content deidentification process 100s. Alternatively, content deidentification process 100 may be implemented as a purely client-side process via one or more of content deidentification process 100c1, content deidentification process 100c2, content deidentification process 100c3, and content deidentification process 100c4. Alternatively still, content deidentification process 100 may be implemented as a hybrid server-side/client-side process via content deidentification process 100s in combination with one or more of content deidentification process 100c1, content deidentification process 100c2, content deidentification process 100c3, and content deidentification process 100c4.

Accordingly, content deidentification process 100 as used in this disclosure may include any combination of content deidentification process 100s, content deidentification process 100c1, content deidentification process 100c2, content deidentification process 100c3, and content deidentification process 100c4.

In some implementations, content deidentification process 100s is a server application and resides on and may be executed by a computer system 300, which may be connected to network 302 (e.g., the Internet or a local area network). Computer system 300 may include various components, examples of which include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 300 may execute one or more operating systems.

The instruction sets and subroutines of content deidentification process 100s, which may be stored on storage device 304 coupled to computer system 300, may be executed by one or more processors (not shown) and one or more memory architectures (not shown) included within computer system 300. Examples of storage device 304 may include but are not limited to: a hard disk drive; a RAID device; a random access memory (RAM); a read-only memory (ROM); and all forms of flash memory storage devices.

Network 302 may be connected to one or more secondary networks (e.g., network 304), examples of which may include but are not limited to: a local area network; a wide area network; or an intranet, for example.

Various 10 requests (e.g., 10 request 308) may be sent from content deidentification process 100s, content deidentification process 100c1, content deidentification process 100c2, content deidentification process 100c3 and/or content deidentification process 100c4 to computer system 300. Examples of IO request 308 may include but are not limited to data write requests (i.e., a request that content be written to computer system 300) and data read requests (i.e., a request that content be read from computer system 300).

The instruction sets and subroutines of content deidentification process 100c1, content deidentification process 100c2, content deidentification process 100c3 and/or content deidentification process 100c4, which may be stored on storage devices 310, 312, 314, 316 (respectively) coupled to client electronic devices 318, 320, 322, 324 (respectively), may be executed by one or more processors (not shown) and one or more memory architectures (not shown) incorporated into client electronic devices 318, 320, 322, 324 (respectively). Storage devices 310, 312, 314, 316 may include but are not limited to: hard disk drives; optical drives; RAID devices; random access memories (RAM); read-only memories (ROM), and all forms of flash memory storage devices. Examples of client electronic devices 318, 320, 322, 324 may include, but are not limited to, personal computing device 318 (e.g., a smart phone, a personal digital assistant, a laptop computer, a notebook computer, and a desktop computer), audio input device 320 (e.g., a handheld microphone, a lapel microphone, an embedded microphone (such as those embedded within eyeglasses, smart phones, tablet computers and/or watches) and an audio recording device), display device 322 (e.g., a tablet computer, a computer monitor, and a smart television), machine vision input device 324 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 326, 328, 330, 332 may access computer system 300 directly through network 302 or through secondary network 306. Further, computer system 300 may be connected to network 302 through secondary network 306, as illustrated with link line 334.

The various client electronic devices (e.g., client electronic devices 318, 320, 322, 324) may be directly or indirectly coupled to network 302 (or network 306). For example, personal computing device 318 is shown directly coupled to network 302 via a hardwired network connection. Further, machine vision input device 324 is shown directly coupled to network 306 via a hardwired network connection. Audio input device 322 is shown wirelessly coupled to network 302 via wireless communication channel 336 established between audio input device 320 and wireless access point (i.e., WAP) 338, which is shown directly coupled to network 302. WAP 338 may be, for example, an IEEE 802.11a, 802.11b, 802.11g, 802.11n, Wi-Fi™, and/or Bluetooth™ device that is capable of establishing wireless communication channel 336 between audio input device 320 and WAP 338. Display device 322 is shown wirelessly coupled to network 302 via wireless communication channel 340 established between display device 322 and WAP 342, which is shown directly coupled to network 302.

The various client electronic devices (e.g., client electronic devices 318, 320, 322, 324) may each execute an operating system, wherein the combination of the various client electronic devices (e.g., client electronic devices 318, 320, 322, 324) and computer system 300 may form modular system 344.

General:

The present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    processing raw content to identify personal information;
    replacing the personal information within the raw content with a first mathematical representation of the personal information generated using a first hashing algorithm, thus defining deidentified content; and
    defining a selected surrogate for the first mathematical representation, wherein the selected surrogate has a second mathematical representation generated using a second hashing algorithm that is equivalent to the first mathematical representation of the personal information that was generated using the first hashing algorithm, wherein the second hashing algorithm includes a variable width that controls the degree of randomness of the second mathematical representation.

2. The computer-implemented method of claim 1, further comprising:
using the deidentified content for initial training of an ML model.

3. The computer-implemented method of claim 1, further comprising:
replacing the first mathematical representation within the deidentified content with the selected surrogate, thus defining surrogated content.

4. The computer-implemented method of claim 3, further comprising:
storing the surrogated content for long-term training of an ML model.

5. The computer-implemented method of claim 3, further comprising:
reconstructing the deidentified content from the surrogated content to enable training of an ML model.

6. The computer-implemented method of claim 1, wherein the personal information includes personally identifiable information.

7. The computer-implemented method of claim 1, wherein defining a selected surrogate for the first mathematical representation includes:
randomly choosing the selected surrogate for the first mathematical representation from a pool of available surrogates that all have a second mathematical representation generated using a second hashing algorithm that is equivalent to the first mathematical representation of the personal information that was generated using the first hashing algorithm.

8. The computer-implemented method of claim 7, wherein the pool of available surrogates is defined by processing a list of items using the second hashing algorithm to define the second mathematical representation for each of the list of items.

9. The computer-implemented method of claim 8, wherein the list of items includes one or more of:
a list of names;
a list of locations;
a list of ailments;
a list of symptoms;
a list of allergies;
a list of medications;
a list of demographic identifiers;
a list of ages;
a list of genders;
a list of races; and
a list of ethnicities.

10. A computer program product residing on a non-transitory computer readable medium having a plurality of instructions stored thereon which, when executed by a processor, cause the processor to perform operations comprising:
processing raw content to identify personal information;
replacing the personal information within the raw content with a first mathematical representation of the personal information generated using a first hashing algorithm, thus defining deidentified content;
defining a selected surrogate for the first mathematical representation, wherein the selected surrogate has a second mathematical representation generated using a second hashing algorithm that is equivalent to the first mathematical representation of the personal information that was generated using the first hashing algorithm, wherein the second hashing algorithm includes a variable width that controls the degree of randomness of the second mathematical representation; and
replacing the first mathematical representation within the deidentified content with the selected surrogate, thus defining surrogated content.

11. The computer program product of claim 10, further comprising:
using the deidentified content for initial training of an ML model.

12. The computer program product of claim 10, further comprising:
storing the surrogated content for long-term training of an ML model.

13. The computer program product of claim 10, further comprising:
reconstructing the deidentified content from the surrogated content to enable training of an ML model.

14. The computer program product of claim 10, wherein defining a selected surrogate for the first mathematical representation includes:
randomly choosing the selected surrogate for the first mathematical representation from a pool of available surrogates that all have a second mathematical representation generated using a second hashing algorithm that is equivalent to the first mathematical representation of the personal information that was generated using the first hashing algorithm.

15. The computer program product of claim 14, wherein the pool of available surrogates is defined by processing a list of items using the second hashing algorithm to define the second mathematical representation for each of the list of items.

16. The computer program product of claim 15, wherein the list of items includes one or more of:
a list of names;
a list of locations;
a list of ailments;
a list of symptoms;
a list of allergies;
a list of medications;
a list of demographic identifiers;
a list of ages;
a list of genders;
a list of races; and
a list of ethnicities.

17. A computing system including a processor and memory configured to perform operations comprising:
processing raw content to identify personal information, wherein the personal information includes personally identifiable information;
replacing the personal information within the raw content with a first mathematical representation of the personal information generated using a first hashing algorithm, thus defining deidentified content;
defining a selected surrogate for the first mathematical representation, wherein the selected surrogate has a second mathematical representation generated using a second hashing algorithm that is equivalent to the first mathematical representation of the personal information that was generated using the first hashing algorithm, wherein the second hashing algorithm includes a variable width that controls the degree of randomness of the second mathematical representation;
replacing the first mathematical representation within the deidentified content with the selected surrogate, thus defining surrogated content; and
storing the surrogated content for long-term training of an ML model.

18. The computing system of claim 17, further comprising:
   using the deidentified content for initial training of an ML model.

19. The computing system of claim 17, further comprising:
   reconstructing the deidentified content from the surrogated content to enable training of an ML model.

20. The computing system of claim 17, wherein defining a selected surrogate for the first mathematical representation includes:
   randomly choosing the selected surrogate for the first mathematical representation from a pool of available surrogates that all have a second mathematical representation generated using a second hashing algorithm that is equivalent to the first mathematical representation of the personal information that was generated using the first hashing algorithm.

\* \* \* \* \*